United States Patent
Okamura et al.

(10) Patent No.: US 10,086,586 B2
(45) Date of Patent: Oct. 2, 2018

(54) COMPOSITE AL MATERIAL FOR DRAWN AND IRONED CAN

(75) Inventors: Takaaki Okamura, Yamaguchi (JP); Hiroaki Togo, Yamaguchi (JP); Takashi Sugimura, Yamaguchi (JP)

(73) Assignee: TOYO KOHAN CO., LTD., Tokyo (JP)

(*) Notice: Subject to any disclaimer, the term of this patent is extended or adjusted under 35 U.S.C. 154(b) by 412 days.

(21) Appl. No.: 13/379,248

(22) PCT Filed: Mar. 26, 2010

(86) PCT No.: PCT/JP2010/002163
§ 371 (c)(1),
(2), (4) Date: Mar. 13, 2012

(87) PCT Pub. No.: WO2010/146755
PCT Pub. Date: Dec. 23, 2010

(65) Prior Publication Data
US 2012/0164440 A1    Jun. 28, 2012

(30) Foreign Application Priority Data

Jun. 17, 2009  (JP) .................................. 2009-144257

(51) Int. Cl.
*B32B 15/08* (2006.01)
*B32B 5/00* (2006.01)
(Continued)

(52) U.S. Cl.
CPC .............. *B32B 15/08* (2013.01); *B21D 22/28* (2013.01); *B21D 35/005* (2013.01); *B21D 51/26* (2013.01);
(Continued)

(58) Field of Classification Search
CPC ......... B32B 27/08; B32B 15/08; B32B 27/00; B32B 27/32; G11B 5/72
See application file for complete search history.

(56) References Cited

U.S. PATENT DOCUMENTS 4,533,576 A * 8/1985 Tanahashi et al. ........... 428/220
5,585,177 A * 12/1996 Okamura et al. ............. 428/341
(Continued)

FOREIGN PATENT DOCUMENTS

JP     04-314535 A    11/1992
JP     08-119285 A     5/1996
(Continued)

*Primary Examiner* — Samir Shah
(74) *Attorney, Agent, or Firm* — Browdy and Neimark, P.L.L.C.

(57) ABSTRACT

Provided is a composite Al material for a drawn and ironed can from which a drawn and ironed can having brightness can be formed. In a resin coated metal plate used for forming a drawn and ironed can, a first resin layer (20) having a thickness of 0.02 to 2 μm is formed on a surface of an Al plate 10 which forms an outer surface of the can, and a second resin layer 30 having a thickness of 1 to 40 μm is formed on a surface of the Al plate 10 which forms an inner surface of the can. In a penetration test using a TMA device, an insertion amount of a quartz pin when a load of 5 g is applied to the first resin layer at a temperature of 100° C. is 20% or less of a film thickness of the first resin layer. Further, the first resin layer has a room temperature of 10 N/mm² or more.

4 Claims, 1 Drawing Sheet

(51) Int. Cl.
    *B21D 22/28*     (2006.01)
    *B21D 35/00*     (2006.01)
    *B21D 51/26*     (2006.01)
    *B32B 15/20*     (2006.01)

(52) U.S. Cl.
    CPC .......... B32B 15/20 (2013.01); *B05D 2202/25* (2013.01); *B05D 2252/10* (2013.01); *B05D 2701/10* (2013.01); *B32B 2255/06* (2013.01); *B32B 2255/26* (2013.01); *B32B 2439/66* (2013.01); *Y10T 428/264* (2015.01); *Y10T 428/265* (2015.01)

(56) References Cited

U.S. PATENT DOCUMENTS

| | | | |
|---|---|---|---|
| 5,777,024 A * | 7/1998 | Killilea et al. | 524/590 |
| 2006/0230800 A1* | 10/2006 | Chichiki et al. | 72/46 |
| 2006/0240270 A1* | 10/2006 | Kuroda et al. | 428/472.2 |
| 2009/0011162 A1* | 1/2009 | Ohashi et al. | 428/35.7 |

FOREIGN PATENT DOCUMENTS

| | | | |
|---|---|---|---|
| JP | 10-044317 A | 2/1998 |
| JP | 10-230212 A | 9/1998 |
| JP | 2001-046960 A | 2/2001 |
| JP | 2003-034322 A | 2/2003 |
| JP | 2004-001392 A | 1/2004 |
| JP | 2006-248012 A | 9/2006 |

* cited by examiner

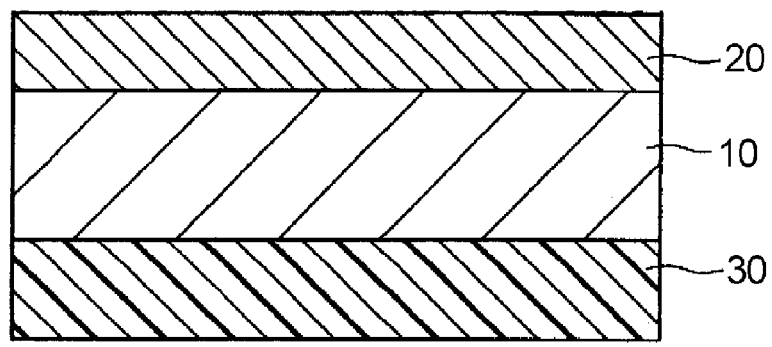

COMPOSITE AL MATERIAL FOR DRAWN AND IRONED CAN

TECHNICAL FIELD

The present invention relates to a composite Al material for a drawn and ironed can whose barrel part possesses excellent brightness when a can body is formed by drawing and ironing forming, and more particularly to a composite Al material for a drawn and ironed can which can impart excellent brightness to a barrel part of a formed can while enabling drawing and ironing forming by dry lubrication without using a coolant in a liquid form.

BACKGROUND ART

Conventionally, as a side-surface seamless can (seamless can), there has been known a drawn and ironed can (DI can) where a wall thickness of a container barrel part is made thin, wherein the DI can is manufactured in such a manner that a metal plate such as aluminum (hereinafter referred to as Al) plate or a tin plate is subject to at least drawing of one stage between a drawing die and punch thus forming by molding a cup which is constituted of a barrel part having no side-surface seam and a bottom portion which is integrally connected with the barrel part without a seam, and ironing is applied to the cup between an ironing punch and die.

Further, there has been also known a drawn and ironed seamless can which uses a resin-coated metal plate where a metal plate is covered with a resin by coating is used as a raw material. In drawing and ironing forming using such a resin coated metal plate as a raw material, while a friction between the metal plate and a tool is reduced using a coolant in a liquid form with respect to the metal plate, drawing and ironing forming of the resin coated metal plate is performed in a dry state by applying a wax or the like to the resin coated metal plate as a lubricant.

However, in such ironing forming in a dry state, it is necessary for the resin coated metal plate to withstand severe working. Aiming at drawing and ironing forming under such dry conditions, for example, patent document 1 discloses a coated metal plate which is formed by studying a coating film amount on a surface of a plate material, a plating condition, a film strength and the like.

PRIOR ART DOCUMENT

Patent Document

Patent document 1: JP-A-2003-34322

SUMMARY OF THE INVENTION

Problems that the Invention is to Solve

Recently, there has been a strong demand for a can having an external appearance with brightness as a characteristic of the can. In the coated metal plate described in the above-mentioned patent document 1, although Al which can easily exhibit brightness as a metal plate is used, a condition on a resin film necessary for the external appearance of a container barrel part to exhibit brightness after forming has not been taken into consideration at all. That is, the condition on the resin film necessary for acquiring brightness is not prescribed and hence, it is difficult for patent document 1 to provide a drawn and ironed can having the external appearance with brightness.

Accordingly, it is a primary object of the present invention to provide a composite Al material which uses an Al plate as a metal plate, exhibits the external appearance with brightness when formed into a can body, and can form a drawn and ironed can having favorable content preserving property which is important as a can performance in a dry method.

Means for Solving the Problems (1) A composite Al material for a drawn and ironed can according to the present invention is a resin coated Al plate for forming a drawn and ironed can, wherein a first resin layer having a thickness of 0.02 to 2 µm is formed on a surface of the Al plate which forms a can outer surface, and a second resin layer having a thickness of 1 to 40 µm is formed on a surface of the Al plate which forms a can inner surface.

(2) The composite Al material for a drawn and ironed can according to the present invention is, in the above-mentioned (1), with respect to the first resin layer, in a penetration test using a TMA device, an insertion amount (%) of a quartz pin when a weight of 5 g is applied to the first resin layer at a temperature of 100° C. is 20% or less of a film thickness of the first resin layer. A detailed measuring method of the insertion amount (%) of the quartz pin is described later.

(3) The composite Al material for a drawn and ironed can according to the present invention is, in the above-mentioned (1) or (2), characterized in that a room-temperature hardness of the first resin layer at a temperature of 28° C. is 10 N/mm$^2$ or more.

A detailed measuring method of the room-temperature hardness is described later.

Advantageous Effects of the Invention

Conventionally, it is considered that, in the resin coated metal plate, it is difficult to suppress surface roughening which occurs due to the deformation of crystal grains on a surface of iron due to ironing and hence, a drawn and ironed can which exhibits high brightness cannot be acquired. According to the present invention, by forming the resin layer having a thickness within a specified range on the surface of the metal plate which forms the can outer surface, it is possible to easily iron the metal plate, and the metal plate can also acquire a surface smoothing action effectively due to ironing thus providing a drawn and ironed can having the external appearance with excellent brightness.

That is, with the use of the composite Al material for a drawn and ironed can according to the present invention, it is possible to provide a drawn and ironed can which exhibits excellent formability and also possesses brightness and content preserving property.

Further, according to the Al material for a drawn and ironed can of the present invention, even when drawing and ironing forming is performed under a dry condition, there is no possibility that apparent lowering of content preserving property, lowering of formability or the like caused by damages on a resin layer formed on the can inner surface due to the generation of metal powder occurs and hence, a drawn and ironed can be manufactured stably.

BRIEF DESCRIPTION OF THE DRAWINGS

FIG. 1 is a view showing one example of the cross-sectional structure of a composite Al material for a drawn and ironed can according to the present invention.

MODE FOR CARRYING OUT THE INVENTION

A composite Al material for a drawn and ironed can according to the present invention is a resin coated Al plate used for forming a drawn and ironed can. As can be understood from the cross-sectional structure of the composite Al material for a drawn and ironed can shown in FIG. 1, a first resin layer 20 having a thickness of 0.02 to 2 µm is formed on a surface of an Al plate 10 which forms a can outer surface.

<First Resin Layer>

When the thickness of the first resin layer 20 is less than 0.02 µm, a portion which is not covered with a resin before forming or after forming, that is, a metal exposed portion becomes apparent and hence, a large amount of metal powder is generated due to rubbing between the metal exposed portion and a die during forming, and a second resin layer 30 which is formed on a can inner surface on a side opposite to the can outer surface is severely damaged by generated metal powder whereby the preserving property of a content preserved in the inside of the can is extremely deteriorated. Accordingly, such a thickness is not preferable.

On the other hand, when the thickness of the first resin layer 20 exceeds 2 µm, the regular reflectance on a can outer surface side of the composite Al material cannot reach 6% which is a target minimum or more and hence, such a thickness is not preferable.

It is also preferable that the first resin layer 20 formed on the Al plate 10 in the present invention has a room-temperature hardness of 10 N/mm² or more. With such room-temperature hardness, a smoothing effect of the Al plate by way of the resin layer 20 can be enhanced and hence, the regular reflectance, that is, the brightness of the drawn and ironed can be enhanced.

To form the resin layer having the room-temperature hardness of 10 N/mm² or more, for example, it is necessary to select a resin such as a crosslinking-type resin such as a polyester-based or urethane acrylate-based UV paint having the rigid molecular structure as a resin content or a non-crosslinking-resin having a high glass transition temperature. Further, the resin layer may not be formed of a resin in a single form, and may be a composite resin which is produced by blending a hard resin into a soft resin or a multi-layered resin to acquire the room temperature hardness.

With respect to the first resin layer 20, the resin layer per se is subject to severe ironing and hence, it is desirable that the first resin layer 20 has elongation to some extent. It is particularly preferable that the first resin layer 20 has the breaking elongation of 5% or more at a temperature of 25° C. when measured in accordance with D-882 of ASTM.

Further, it is desirable that the first resin layer 20 exhibits excellent adhesiveness to an Al raw material, and it is also desirable that concentration of a carbonyl group in the resin is 10 meq/100 g resin or more.

The first resin layer 20 of the resin coated metal plate of the present invention is formed by applying paint in which a resin content is resolved in a solvent, an aqueous dispersion material in which a resin content is dispersed or paint which is formed of a solid content by 100% such as a ultraviolet curing type paint by coating or by laminating a cast film or by directly performing extrusion coating of a resin.

<Second Resin Layer>

In the present invention, the formation of the second resin layer 30 having a thickness of 1 to 40 µm on a surface of the Al plate which forms in a can inner surface is also important for the acquired drawn and ironed can to perform functions which are required as a content preserving container.

That is, when the thickness of the second resin layer is less than 1 µm, the content protective property is deteriorated and hence, leaking of liquid occurs. Accordingly, such a thickness is not preferable. On the other hand, even when the thickness of the second resin layer 30 exceeds 40 µm, the content protective property is not changed and only economical efficiency is deteriorated. Accordingly, such a thickness is also not preferable.

With respect to the second resin layer 30 which is formed on the surface of the Al plate which constitutes the surface on a can inner surface side, in the same manner as the first resin layer 20, the resin layer per se is subject to severe ironing and hence, it is preferable that the second resin layer 30 possesses elongation to some extent. It is particularly preferable that the second resin layer 20 has the breaking elongation of 5% or more at a temperature of 25° C. when measured in accordance with D-882 of ASTM.

Further, it is desirable that no change in appearance occurs due to corrosion of the Al plate. It is particularly preferable that water absorption when measured in accordance with D570 to 63 of ASTM (at a temperature of 23° C. for 24 hours) is equal to 15% or less.

Still further, it is desirable that the second resin layer 30 possesses excellent adhesiveness to an Al raw material, and it is preferable that the concentration of carbonyl group in a resin is 10 meq/100 g resin or more. A resin which can be used for forming the second resin layer 30 of the present invention is not limited to such a resin, and the following resins can be used.

That is, a polyester group such as polyethylene terephthalate, polyethylene terephthalate/isophthalate, polytetramethylene terephthalate, polyethylene/tetramethylene terephthalate, polytetramethylene terephthalate/isophthalate, polytetramethylene/ethylene terephthalate, polyethylene/tetramethylene terephthalate/isophthalate, polyethylene/oxybenzoate or a blended material of these components; a polycarbonate group such as poly-p-xylylene glycol bis carbonate, poly-dihydroxy diphenyl-methane carbonate, poly-dihydroxy diphenol 2,2-propane carbonate or poly-dihydroxy diphenyl 1,1-ethane carbonate; a polyamide group such as a poly-ω-aminocaproic acid, a poly-ωamino heptanoic acid, a poly-ω-amino caprylic acid, a poly-ω-amino pelargonic acid, poly-ω-amino decanoic acid, a poly-ω-amino undecanoic acid, a poly-ω-amino dodecanoic acid, a poly-ω-amino tridecanoic acid, a polyhexamethylene adipamide, polyhexamethylene sebacamide, polyhexamethylene dodecamide, polyhexamethylene tridecamide, polydecamethylene adipamide, polydecamethylene sebacamide, polydecamethylene dodecamide, polydecamethylenetridecamide, polydodecamethyleneadipamide, polydodecamethylene sebacamide, polydodecamethylene dodecamide, polytridecamethylene adipamide, polytridecamethylene sebacamide, polytridecamethylene dodecamide, polydodecamethylene azeramide, polytridecamethylene azeramide or copolyamide of these components; a polyamidimide resin, an acrylic resin, a urethane acrylate resin, an epoxy resin and the like can be used.

By taking the above-mentioned requirements, as a resin which can be preferably used, polyester, particularly ethylene terephthalate-based polyester which contains an isophthalic acid as a copolymer content can be preferably used.

<Al Plate>

As an Al plate 10 used in the present invention, an Al plate or the like which has been used conventionally in the manufacture of a drawn and ironed can be used. In general, however, an Al plate having a plate thickness which falls within a range from 0.1 to 0.5 mm can be preferably used in accordance with an application.

Further, it is preferable to set arithmetic average surface roughness (Ra) of a surface of the Al plate to 0.6 μm or less from a viewpoint of brightness. That is, when the arithmetic average surface roughness Ra exceeds 0.6 μm so that the surface of Al plate is rough, a resin layer in a valley portion is entangled during ironing so that the surface smoothness is deteriorated. As a result, there may be a case where the regular reflectance, that is, the brightness is lowered. Accordingly, the arithmetic average surface roughness Ra of more than 0.6 μm is not preferable.

Any one of chromate treatment, chromate-phosphate treatment and zirconium treatment may be applied to the Al plate as post treatment.

(Manufacturing Method of Composite Al Material for Drawn and Ironed can)

The composite Al material according to the present invention can be manufactured by a step where the first resin layer 20 having a thickness of 0.02 to 2.0 μm is formed on one surface of the Al plate 10, and a step where the second resin layer 30 having a thickness of 1 to 40 μm is formed on the other surface of the Al plate 10.

Further, from a viewpoint of enhancing adhesiveness between the Al plate 10 and the first resin layer 20 and the adhesiveness between the Al plate 10 and the second resin layer 30, a surface treatment layer may be also formed on the Al plate 10 in advance.

As such surface treatment, a method where chromium hydrous oxide film is formed on the Al plate by immersion treatment in an aqueous solution of bichromate or by electrolytic treatment, a method where a two-layered film made of metal chromium and chromium hydrous oxide is formed on the Al plate by electrolytic treatment in aqueous solution of chromic anhydride, a method where a thin layer made of an organic resin such as a poly acrylic acid or an epoxy resin or the like is formed on the Al plate, or a method where silane coupling treatment is applied to the Al plate or the like can be used. These surface treatments can be performed by conventionally known methods.

In forming the first resin layer 20 on the Al plate 10 by applying paint by coating, the first resin layer 20 can be formed by a conventionally known coating method such as a roll coater coating method represented by a gravure coater coating method, a spray coating method or the like.

A thickness of the coated film can be adjusted by adjusting a coated amount, an amount of a solvent or an amount of resin in paint. The thickness of the coated film can be also adjusted by adjusting roughness of meshes of the gravure or the like when the gravure coater coating method is used in coating.

The formation of the second resin layer 30 can be carried out simultaneously with the formation of the first resin layer 20 or may be carried out before or after the formation of the first resin layer 20. However, it is noted that the selection of the respective resin layers and the methods of forming the resin layers should be decided such that the first resin layer 20 and the second resin layer 30 do not give rise to abnormality in appearance due to adhesion of these layers to rolls or the like.

When the second resin layer 30 is formed using a resin film, in the same manner as the first resin layer 20, the second resin layer 30 may be formed by coating paint or an extrusion coating method besides the lamination of a cast film by thermal bonding or the like.

The composite Al material for a drawn and ironed can according to the present invention can be preferably used in conventionally known forming of a drawn and ironed can. Further, not to mention a case where a coolant in a liquid form is used, it is also possible to form a drawn and ironed can with favorable formability in forming under a dry condition without using a coolant.

That is, a blanked plate which is punched out from the resin coated metal plate of the present invention is formed into a cup-shaped body by drawing using a drawing die in one stage or plural stages. Then, using an ironing die in one stage or plural stages, a barrel part of the cup-shaped body is forcibly pushed into a clearance portion between the ironing die and the punch set smaller than a thickness of the barrel part of the cup-shaped body, and ironing is applied so as to increase a height of the barrel part while decreasing a thickness of the barrel part. Through these steps, it is possible to acquire a drawn and ironed can which has a relatively small can diameter, a large can-barrel part height, and a small barrel part-thickness.

EXAMPLES

The present invention is explained in detail hereinafter in conjunction with examples.

(Evaluation Items)

[Regular Reflectance of Barrel Part]

A barrel part having a width of 20 mm from a position 60 mm away from a can bottom of a formed drawn can in the height direction is cut away in the circumferential direction, and the cut away barrel part having a width of 20 mm is divided into eight pieces in the can height direction, and these pieces are used as measurement samples.

The total reflectance and the diffusion reflectance of a center portion of the measurement sample are measured using a spectrophotometric colorimetry meter (made by Konica Minolta Holdings, Inc., type: CM-3500), and the regular reflectance is calculated by the following formula.

regular reflectance (%)=total reflectance (%)−diffusion reflectance (%)

An average value of regular reflectances of eight pieces of samples is calculated by discarding digits to the right of the decimal point, and the calculated value is set as the regular reflectance of the barrel part described in the example.

In this embodiment, it is determined that the measurement sample which has the regular reflectance of 6% or more, preferably 10% or more has the practicality. Further, when the regular reflectance is 25% or more, this implies that the measurement sample has acquired the regular reflectance substantially equal to or more than the regular reflectance of an expensive metallic label which is applied to a can for acquiring brightness and hence, the barrel part having the regular reflectance of 25% or more is more preferable.

[Leaking of Liquid]

Since an upper end portion of the can obtained by drawing and ironing forming is undulated, a portion of the barrel part which is positioned 2 mm below a position which is the lowest position in height from a bottom of the can or the lowest position in height at the undulated upper end portion is cut in the circumferential direction, and the portion of the barrel part above the cut portion is removed thus forming the can having a fixed height over the circumference. Thereafter, flange forming is applied to the upper end portion, a content (Coca Cola: registered trademark) is filled in the can to a level which is 90 percent of the can height, an aluminum lid to which an epoxy-phenol-based paint is applied by baking with a thickness of 10 μm after drying is seamed to the can. In a state where the can is arranged with a surface of the aluminum lid down, 100 pieces of cans are left under atmospheres which are at temperatures of 37° C. and 50° C. for 6 months respectively, and the number of cans which cause leaking of oil is counted with respect to the respective atmospheres.

The most favorable cans are cans which exhibit the favorable flavor property even after leaving the cans in the atmosphere at the temperature of 50° C. for six months. However, it is determined that the cans which exhibit the favorable flavor property in the atmosphere at a temperature of 37° C. for six months have practicality.

[Flavor]

Contents of in the cans which are left in the atmospheres at temperatures of 37° C. and 50° C. for 6 months in the above-mentioned leaking of liquid test are sampled, and flavors of contents of all cans are investigated by 30 persons. It is determined that flavor is abnormal when three or more persons feel flavor abnormality even only with one can with respect to various kinds of coated metal plates, and it is determined that the flavor is normal when such persons are less than three.

The most favorable cans are cans which exhibit the favorable flavor property even after leaving the cans in the atmosphere at the temperature of 50° C. for six months. However, it is determined that the cans which exhibit the favorable flavor property in the atmosphere at a temperature of 37° C. for six months have practicality.

[Quartz Pin Insertion Amount (%)]

The quartz pin insertion amount (%) is a value obtained in such a manner that a quartz pin insertion test is carried out under a test condition described in the following 1) by a penetration method using a device TMA8140C made by Rigaku Corporation, a insertion depth of a quartz pin into coated film measured under the following condition is measured, and the quartz pin insertion amount (%) is measured by the following method 2).

In the same manner as the room-temperature hardness described below, when the film thickness is small, there exists a possibility that a measured value is largely influenced by a surface state of a resin layer or Al, or the measured value is influenced by vibrations. Accordingly, a resin layer having a thickness after drying of 15 μm is formed on the same Al (plate thickness: 0.28 mm, 3104 alloy material, Ra=0.34) using the same resin as the example and also under the same condition as the example, and an insertion amount of a quartz pin into the resin layer of the dried and cured sample is measured.

1) insertion amount measurement condition
(1) shape of surface of quartz pin which is brought into contact with resin: 0.5 mmφ flat
(2) load applied to quartz pin: 5 g
(3) temperature elevation speed: 10° C./min . . . room temperature to 100° C.
(4) temperature elevation environment: atmosphere
2) insertion amount of quartz pin (%)=depth of quartz pin inserted into the inside of coated film from surface of coated film at temperature of 100° C. (μm)/thickness of coated film (μm)×100*thickness of coated film being set to 15 μm in all samples.

[Room-Temperature Hardness]

Room-temperature hardness is a value obtained by measuring a hardness of a resin layer at a temperature of 28° C. in accordance with ISO14577-2002 using an ultra minute insertion hardness tester ENT-1100a made by ELIONIX INC with a maximum load which satisfies a condition that an insertion depth of Berkovich indenter is 1/10 or less of a coated film to be measured.

When a film thickness is small, there exists a possibility that the measured value is largely influenced by a surface state of a resin layer or Al or a possibility that the measured value is influenced by vibrations. Accordingly, in this test, a resin layer having a thickness after drying of 15 μm is formed on the same Al plate (plate thickness: 0.28 mm, 3104 alloy material, Ra=0.34) using the same resin as the example and also under the same condition as the example, and a room-temperature hardness of the resin layer of the dried and cured sample is measured. This measured value is set as the room-temperature hardness.

As the Berkovich indenter, an indenter where a correction length (Δhc) indicative of wear of the indenter is 15 nm or less is used.

Example 1

Chromate-phosphate treatment (20 mg/cm$^2$ in terms of Cr) is applied to surfaces of an Al plate (plate thickness: 0.28 mm, 3104 alloy material, Ra=0.34) which forms inner and outer surfaces of a can. Thereafter, the Al plate is heated until the plate temperature becomes 220° C., and an unstretched isophtalic acid/terephthalic acid copolymer polyester film (melting point: 210° C., film thickness: 16 μm) made by Toyo Kohan Co., Ltd. is applied to a surface which forms the inner surface of the can, and the film is cooled so as to form a second resin layer 30. Paint having low viscosity is formed by adding and sufficiently mixing 6 parts by weight of 1 hydroxy-cyclohexil-phenyl-ketone which is a photo-polymerization starting agent to 100 parts by weight of a urethane acrylate-based UV paint A having physical properties shown in Table 1 and by diluting the mixture with toluene. The paint is applied to the surface which forms the outer surface of the can until a thickness after drying becomes 2 μm and, thereafter, the paint is dried for 1 minute at a temperature of 120° C. so as to remove a solvent. Thereafter, ultraviolet rays are irradiated to the paint at 1600 mj/cm$^2$ by a metal halide lamp from a height of 10 cm using a UV irradiation device (type: ECS-401GX) made by EYE GRAPHICS Co., Ltd. thus forming a first resin layer 20 by crosslinking. A composite Al material is obtained by the above-mentioned steps.

50 mg/m$^2$ of glamour wax is applied to both surfaces of the composite Al material and, thereafter, drawing and ironing forming is performed under the following forming conditions in dry atmosphere in a state that the can inner surface is formed of the surface covered with a copolymer polyester film made by Toyo Kohan Co., Ltd. thus forming a drawn and ironed can.

Properties of the drawn and ironed can are evaluated with respect to the regular reflectance of the outer surface, leaking of liquid of the can after a lapse of time from filling a content and flavor of the content using the above-mentioned evaluation method. The result of the evaluation is shown in Table 1. After the lapse of at least six months in a state where the can is held at a temperature of 50° C. after filling the content, no leaking of liquid is recognized and the flavor is also favorable so that the can exhibits can properties capable of withstanding a practical use, and a can barrel part exhibits high regular reflectance so that the can acquires bright appearance.

<Drawing and Ironing Forming Condition>
1. forming temperature: temperature of punch immediately before forming: 55° C.

2. temperature of die: 40° C.
3. diameter of blank: 142 mm
4. drawing condition: 1st drawing ratio: 1.56, 2nd drawing ratio: 1.38
5. diameter of ironing punch: 66 mm
6. total ironing rate: 63% (center portion of side wall)
7. can manufacturing speed: 100 cpm Examples 2 and 3

As shown in Table 1, composite Al materials are formed in the same manner as the composite Al material of the example 1 except for that thicknesses of coated films formed on outer surfaces are set to 0.2 µm, 0.3 µm respectively and the coated films form first resin layers 20. The composite Al materials are subject to drawing and ironing forming in the same manner as the example 1 thus forming drawn and ironed cans.

The result obtained by evaluating the properties of the drawn and ironed cans in the same manner as the example 1 is shown in Table 1. Even after the lapse of at least six months in a state where the can is held at a temperature of 37° C. after filling the content in the can, no leaking of liquid is recognized and the flavors are also favorable so that the cans exhibit can properties capable of withstanding a practical use, and can barrel portions exhibit high regular reflectance so that the cans acquire bright appearance.

Example 4

A composite Al material is formed in the same manner as the composite Al material in the example 3 except for that an Al plate is formed using 3004 alloy and has the arithmetic average surface roughness Ra of 0.13 µm is used. The composite Al material is subject to drawing and ironing forming in the same manner as the example 1 thus forming a drawn and ironed can.

The result obtained by evaluating the property of the drawn and ironed can in the same manner as the example 3 is shown in Table 1. Even after the lapse of at least six months in a state where the can is held at a temperature of 50° C. after filling the content, no leaking of liquid is recognized and the flavor is also favorable so that the can exhibits can properties capable of withstanding a practical use, and a can barrel portion exhibits high regular reflectance so that the can acquires bright appearance.

Examples 5 and 6

As shown in Table 1, drawn and ironed cans are formed in the same manner as the drawn and ironed can in the example 3 except for that a second resin layer 30 is formed such that an isophtalic acid/terephthalic acid copolymer polyester resin (melting point: 210° C.) having the same composition as the resin layer applied to the inner surface of the can of the example 1 is applied to inner surfaces of the formed cans with a film thickness of 1 µm and 40 µm respectively, and when the film thickness is 1 µm, the resin layer is formed by applying the resin by coating in a state where the resin is dissolved in a solvent, and when the film thickness is 40 µm, the resin layer is formed by coating in a form of a film.

The result obtained by evaluating the properties of the drawn and ironed cans in the same manner as the example 3 is shown in Table 1. Even after the lapse of at least six months in a state where the can is held at a temperature of 50° C. after filling the content, no leaking of liquid is recognized and the flavors are also favorable so that the cans exhibit can properties capable of withstanding a practical use, and the can barrel portions exhibit high regular reflectance so that the cans acquire the external appearance with brightness.

Examples 7 to 9

Drawn and ironed cans are formed in the same manner as the drawn and ironed can of the example 3 except for the following. Paint having low viscosity is prepared by sufficiently adding and sufficiently mixing 6 parts by weight of the same photo-polymerization starting agent used in the example 1 to 100 parts by weight of a urethane acrylate-based UV paint B, a urethane acrylate-based UV paint C or a urethane acrylate-based UV paint D which exhibits physical properties shown in Table 1 after drying and cross-linking, and by diluting the mixture with toluene. The paint is applied to a surface which forms an outer surface of the can by coating thus forming a first resin layer 20 having a thickness after drying of 0.3 µm. The result obtained by evaluating the properties of the drawn and ironed cans in the same manner as the example 3 is shown in Table 1. Even after the lapse of at least six months in a state where the can is held at a temperature of 50° C. after filling the content, no leaking of liquid is recognized and the flavors are also favorable so that the cans exhibit can properties capable of withstanding a practical use, and can barrel portions exhibit high regular reflectance so that the cans acquire the external appearance with brightness.

Example 10

A drawn and ironed can is formed in the same manner as the drawn and ironed can in the example 3 except for the following. A thermoplastic paint having low viscosity is prepared by diluting an ester urethane-based paint E having physical properties shown in Table 1 after drying with toluene, and the paint is applied to a surface which forms an outer surface of a can. Thereafter, the can is dried only for one minute at a temperature of 150° C. thus forming a first resin layer 20 without cross-linking. The result obtained by evaluating the properties of the drawn and ironed can in the same manner as the example 3 is shown in Table 1. Even after the lapse of at least six months in a state where the can is held at a temperature of 50° C. after filling the content, no leaking of liquid is recognized and the flavors are also favorable so that the can exhibits can properties capable of withstanding a practical use, and a can barrel portion exhibits high regular reflectance so that the can acquires the external appearance with brightness.

Comparison Example 1 and 2

As shown in Table 2, composite Al materials are formed in the same manner as the composite Al material of the example 3 except for that thicknesses of first resin layers 20 of coated films on outer surfaces cans are set to 0.015 μm and 3 μm respectively. The composite Al materials are subject to drawing and ironing forming in the same manner as the example 3 thus forming drawn and ironed cans.

The result obtained by evaluating the properties of the drawn and ironed cans in the same manner as the example 1 is shown in Table 2. When the thickness of the first resin layer 20 is 0.015 μm, leaking of liquid is recognized when six months elapse in a state where the can is held at a temperature of 50° C. after filling the content, and the flavors are not good even when six months elapse at a temperature of 37° C. after filling the content so that the cans do not exhibit can properties capable of withstanding a practical use. Further, when the thickness of the first resin layer 20 is 3 μm, the can barrel portion exhibits inferior regular reflectance so that the can does not exhibit can properties capable of withstanding a practical use.

Comparison Example 3

A drawn and ironed can is formed in the same manner as the drawn and ironed can of the example 5 except for that a resin layer having the same composition as the resin layer of the example 5 and having a film thickness of 0.8 μm is applied to an inner surface of a can by coating. The result obtained by evaluating the properties of the drawn and ironed can in the same manner as the example 5 is shown in Table 2. Leaking of liquid is recognized when six months elapse in a state where the can is held at a temperature of 37° C. after filling the content, and the flavors are also not good so that the cans do not exhibit can properties capable of withstanding a practical use.

Comparison Example 4

As shown in Table 2, a drawn and ironed can is formed in the same manner as the drawn and ironed can in the example 1 except for the following. Chromate phosphate treatment (20 mg/cm$^2$ in terms of Cr) is applied to surfaces of an Al plate (plate thickness: 0.28 mm, 3104 alloy material, Ra=0.34) which form inner and outer surfaces of a can and, thereafter, a thermoplastic paint which is formed by diluting an ester urethane-based paint F having physical properties shown in Table 2 in a non-cross-linking state after drying with toluene and has low viscosity is applied to the surface of the Al plate which forms the outer surface of the can. Thereafter, the can is dried only for one minute at a temperature of 150° C. thus forming a first resin layer 20 without cross-linking. The result obtained by evaluating the properties of the drawn and ironed can in the same manner as the example 3 is shown in Table 2, and a can barrel portion exhibits inferior regular reflectance so that the can does not exhibit can properties capable of withstanding a practical use as a material for a brightness can.

TABLE 1

| | | resin layer 1 | | | | | | | | |
|---|---|---|---|---|---|---|---|---|---|---|
| | Al Ra | | thickness | quartz pin pushing | room-temperature hardness | resin layer 2 thickness | regular reflectance | leaking of liquid (%) | | flavor |
| No. | (μm) | kind of resin | (μm) | amount (%) | (N/mm2) | (μm) | (%) | 37° C. | 50° C. | 37° C. | 50° C. |
| 1 | 0.32 | urethane acrylate-based UV paint A | 2 | 0 | 20 | 16 | 12 | not present | not present | good | good |
| 2 | 0.32 | urethane acrylate-based UV paint A | 0.02 | 0 | 20 | 16 | 45 | not present | defective | good | defective |
| 3 | 0.32 | urethane acrylate-based UV paint A | 0.3 | 0 | 20 | 16 | 39 | not present | not present | good | good |
| 4 | 0.13 | urethane acrylate-based UV paint A | 0.3 | 0 | 20 | 16 | 40 | not present | not present | good | good |
| 5 | 0.32 | urethane acrylate-based UV paint A | 0.3 | 0 | 20 | 1 | 38 | not present | not present | good | good |
| 6 | 0.32 | urethane acrylate-based UV paint A | 0.3 | 0 | 20 | 40 | 39 | not present | not present | good | good |
| 7 | 0.32 | urethane acrylate-based UV paint B | 0.3 | 0 | 35 | 16 | 40 | not present | not present | good | good |
| 8 | 0.32 | urethane acrylate-based UV paint C | 0.3 | 0 | 9.1 | 16 | 17 | not present | not present | good | good |
| 9 | 0.32 | urethane acrylate-based UV paint D | 0.3 | 0 | 233 | 16 | 42 | not present | not present | good | good |
| 10 | 0.32 | ester urethane-based paint E | 0.3 | 20 | 283 | 16 | 11 | not present | not present | good | good |

*1) Regular reflectance: at least 6%, preferably 10% or more, and more preferably 25% or more . . . . Al exhibits a metallic tone even when regular reflectance of Al is lower than regular reflectance of steel slightly.
2) Leaking of liquid and flavor: Good at least at a temperature of 37° C. and, preferably good even at a temperature of 50° C.

TABLE 2

Comparison examples

| | | resin layer 1 | | | | | | | leaking of liquid (%) | | flavor | |
|---|---|---|---|---|---|---|---|---|---|---|---|---|
| No. | Al Ra (μm) | kind of resin | thickness (μm) | quartz pin pushing amount (%) | room-temperature hardness (N/mm2) | resin layer 2 thickness (μm) | regular reflectance (%) | | 37° C. | 50° C. | 37° C. | 50° C. |
| 1 | 0.32 | urethane acrylate-based UV paint A | 0.015 | 0 | 20 | 16 | 46 | | not present | not present | defective | defective |
| 2 | 0.32 | urethane acrylate-based UV paint A | 3 | 0 | 20 | 16 | 5 | | not present | not present | good | good |
| 3 | 0.32 | urethane acrylate-based UV paint A | 0.3 | 0 | 20 | 0.8 | 38 | | present | present | defective | defective |
| 4 | 0.32 | ester urethane-based paint F | 2 | 26 | 208 | 16 | 4 | | not present | not present | good | good |

*1) Regular reflectance: at least 6%, preferably 10% or more, and more preferably 25% or more . . . . Al exhibits a metallic tone even when regular reflectance of Al is lower than regular reflectance of steel slightly
2) Leaking of liquid and flavor: Good at least at a temperature of 37° C. and, preferably good even at a temperature of 50° C.

EXPLANATION OF SYMBOLS

10: Al plate
20: first resin layer
30: second resin layer insertion amount (%)

The invention claimed is:

1. A composite Al material for a drawn and ironed can, wherein the composite Al material for a drawn and ironed can is a product of
applying drawing forming and ironing forming to an Al plate where a first resin layer having a thickness of 0.02 to 2 μm is formed on a surface of the Al plate which forms an outer surface of the can such that the regular reflectance of an outer surface of the can after working becomes 6% or more;
wherein the first resin layer consists of a polyester-based resin or an urethane acrylate-based resin, the resin of the first resin layer having a room temperature hardness of 10 N/mm$^2$ or more,
wherein the first resin layer has a quartz pin penetration amount of 20% or less of the first resin layer thickness, the quartz pin penetration being conducted in a penetration test using a TMA device at a load of 5 g and a temperature of 100° C.,
wherein a second resin layer is formed opposite to the first resin layer with respect to the Al plate, and wherein the second resin layer is thicker than the first resin layer.

2. A composite Al material for forming a drawn and ironed can comprising an Al plate, a first resin layer and a second resin layer,
wherein the Al plate has an arithmetic average surface roughness (Ra) on a surface of 0.6 μm or less;
wherein the first resin layer having a thickness of 0.02 to 2 μm is formed on a surface of the Al plate which forms an outermost surface of the can, and wherein the first resin layer consists of a polyester-based resin or an urethane acrylate-based resin, the resin of the first resin layer having a room temperature hardness of 10 N/mm$^2$ or more,
wherein the second resin layer having a thickness of 1 to 40 μm is formed on a surface of the Al plate which forms an inner surface of the can,
wherein the first resin layer has a quartz pin penetration amount of 20% or less of the first resin layer thickness, the quartz pin penetration being conducted in a penetration test using a TMA device at a load of 5 g and a temperature of 100° C.,
wherein brightness of the Al plate is exhibited by way of the first resin layer,
wherein the second resin layer is formed opposite to the first resin layer with respect to the Al plate, and wherein the second resin layer is thicker than the first resin layer,
wherein the composite Al material has a regular reflectance of 6% or more.

3. The composite Al material of claim 2 wherein the composite Al material has the regular reflectance of 10% or more.

4. The composite Al material of claim 2 wherein the composite Al material has the regular reflectance of 25% or more.

* * * * *